(12) United States Patent
Golwalkar et al.

(10) Patent No.: US 8,423,560 B2
(45) Date of Patent: *Apr. 16, 2013

(54) FILTER RANGE BOUND PAGED SEARCH

(75) Inventors: Yogesh Vilas Golwalkar, Pune (IN);
Kristin Marie Hazlewood, Austin, TX (US); Magesh Rajamani, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/414,409

(22) Filed: Mar. 7, 2012

(65) Prior Publication Data

US 2012/0166455 A1 Jun. 28, 2012

Related U.S. Application Data

(63) Continuation of application No. 12/484,435, filed on Jun. 15, 2009, now Pat. No. 8,219,565.

(51) Int. Cl.
*G06F 7/00* (2006.01)
*G06F 17/30* (2006.01)

(52) U.S. Cl.
USPC .......................................... 707/754; 707/759

(58) Field of Classification Search .................. 707/752, 707/753, 754, 759
See application file for complete search history.

(56) References Cited

U.S. PATENT DOCUMENTS

| | | | |
|---|---|---|---|
| 6,366,913 B1 | 4/2002 | Fitler, Jr. et al. | |
| 6,408,306 B1 | 6/2002 | Byrne et al. | |
| 6,768,988 B2 | 7/2004 | Boreham et al. | |
| 6,801,906 B1 * | 10/2004 | Bates et al. | 707/707 |
| 6,954,761 B2 | 10/2005 | Azuma | |
| 7,024,693 B2 | 4/2006 | Byrne | |
| 7,933,884 B2 * | 4/2011 | Menezes et al. | 707/706 |
| 2003/0115606 A1 * | 6/2003 | Menez | 725/60 |
| 2004/0193612 A1 * | 9/2004 | Chang | 707/10 |
| 2005/0010915 A1 * | 1/2005 | Chen | 717/170 |
| 2005/0080792 A1 | 4/2005 | Ghatare | |
| 2005/0108220 A1 * | 5/2005 | Silverbrook et al. | 707/3 |

(Continued)

OTHER PUBLICATIONS

Howes, "An X.500 and LDAP Database: Design and Implementation", Technical report, Center for Information Technology Integration, Aug. 1995, pp. 1-9, http://tulip.bu.ac.th/~nattakorn.c/ldap_radius/xldbm.pdf.

(Continued)

*Primary Examiner* — Phong Nguyen
(74) *Attorney, Agent, or Firm* — Yee & Associates, P.C.; Jeffrey S. LaBaw

(57) ABSTRACT

A filter range based search control to request a range of data from one or more directory servers. A directory server receives a search request from a client application comprising a search filter control defining a set of requested data, a sort control defining a sorting order of the set of requested data, and a range filter control defining a range of entries in the requested data. Data entries matching a search value defined in the search filter control and sorted according to sort attributes defined in the sort control are obtained from a set of directories associated with the directory server to form a sorted list of matching entries. A subset of data entries in the sorted list that match a range value defined in the range filter control are collected, and a response comprising the collected subset of data entries is then sent to the client application.

15 Claims, 5 Drawing Sheets

U.S. PATENT DOCUMENTS

| | | | |
|---|---|---|---|
| 2006/0000910 A1* | 1/2006 | Chong et al. | 235/462.15 |
| 2006/0053168 A1* | 3/2006 | McDougall et al. | 707/104.1 |
| 2006/0064411 A1* | 3/2006 | Gross et al. | 707/3 |
| 2006/0116983 A1* | 6/2006 | Dettinger et al. | 707/3 |
| 2007/0112741 A1* | 5/2007 | Crawford | 707/3 |
| 2008/0168135 A1* | 7/2008 | Redlich et al. | 709/204 |
| 2009/0112727 A1* | 4/2009 | Chi et al. | 705/26 |
| 2009/0113419 A1* | 4/2009 | Ansari et al. | 717/178 |
| 2009/0193014 A1* | 7/2009 | Menezes et al. | 707/5 |
| 2009/0300013 A1* | 12/2009 | Kodavalla et al. | 707/6 |
| 2009/0313055 A1* | 12/2009 | Martin et al. | 705/6 |
| 2010/0318541 A1 | 12/2010 | Golwalkar et al. | |

OTHER PUBLICATIONS

USPTO Notice of Allowance, U.S. Appl. No. 12/484,435, Mar. 2, 2012, pp. 1-12.
Response to Office Action, U.S. Appl. No. 12/484,435, Jan. 20, 2012, pp. 1-19.
USPTO Non-Final Office Action, U.S. Appl. No. 12/484,435, Oct. 21, 2011, pp. 1-16.

* cited by examiner

FILTER RANGE BOUND PAGED SEARCH

CROSS-REFERENCE TO RELATED APPLICATIONS

This application is a continuation of and claims the benefit of priority to U.S. patent application Ser. No. 12/484,435 entitled "Filter Range Bound Paged Search" filed on Jun. 15, 2009, status allowed.

BACKGROUND OF THE INVENTION

1. Field of the Invention

Embodiments of the present invention relate generally to an improved data processing system, and in particular to a computer implemented method, data processing system, and computer program product for using a filter range based search control in a communication protocol to request a range of sorted data from one or more directory servers.

2. Description of the Related Art

A directory is a special type of database for managing information about people, organizations, data processing systems, and other information sources. Information within a directory is organized within a hierarchical namespace. Each entry in the directory is a named object and consists of a set of attributes. Each attribute has a defined attribute type and one or more values. Each entry is identified by an unambiguous distinguished name (DN), wherein a distinguished name is a concatenation of selected attributes from an entry. A directory service provides a mechanism for searching a directory and for retrieving information from a directory.

Directory services serve as central repository for searching, adding, deleting and modifying data. Example methods of accessing directory services in a computer network include X.500 and Lightweight Directory Access Protocol (LDAP), among others. Lightweight Directory Access Protocol (LDAP) is a software protocol for enabling a user to locate organizations, individuals, and other resources such as files and devices in a network, whether on the Internet or on a corporate Intranet. LDAP is a "lightweight" version of Directory Access Protocol (DAP), which is part of X.500, a standard for directory services in a network.

In certain situations, it may be desirable to limit the number of search items that are returned to the client from the directory server. One such instance is when the requesting client has limited resources or is connected to a directory server via a low-bandwidth connection. In existing systems, one common method of limiting the number of search items returned to the client is through the use of a paged search results function. A paged search results function may be used in a communication protocol to control the rate at which data is returned to the client from the directory server, such that the client may receive a few entries (a page) at a time rather than receiving all of the search results at once. The paged search results function is defined by Request for Comments (RFC) 2696 published by the Internet Engineering Task Force (IETF).

BRIEF SUMMARY OF THE INVENTION

Embodiments of the present invention provide a filter range based search control to request a range of data from one or more directory servers. A directory server receives a search request from a client application comprising a search filter control, a sort control and a range filter control. The search filter control defines a set of requested data. The sort control defines a sorting order of the set of requested data. The range filter control defines a range of entries in the set of requested data. The directory server obtains data entries from a set of directories associated with the directory server. The data entries match a search value defined in the search filter control, and the matching data entries are sorted according to sort attributes defined in the sort control to form a sorted list of matching entries. The directory server then collects a subset of data entries in the sorted list of matching entries, wherein the subset of data entries match a range value defined in the range filter control. The directory server then sends a response comprising the collected subset of data entries to the client application.

DETAILED DESCRIPTION OF THE INVENTION

Figure 1:
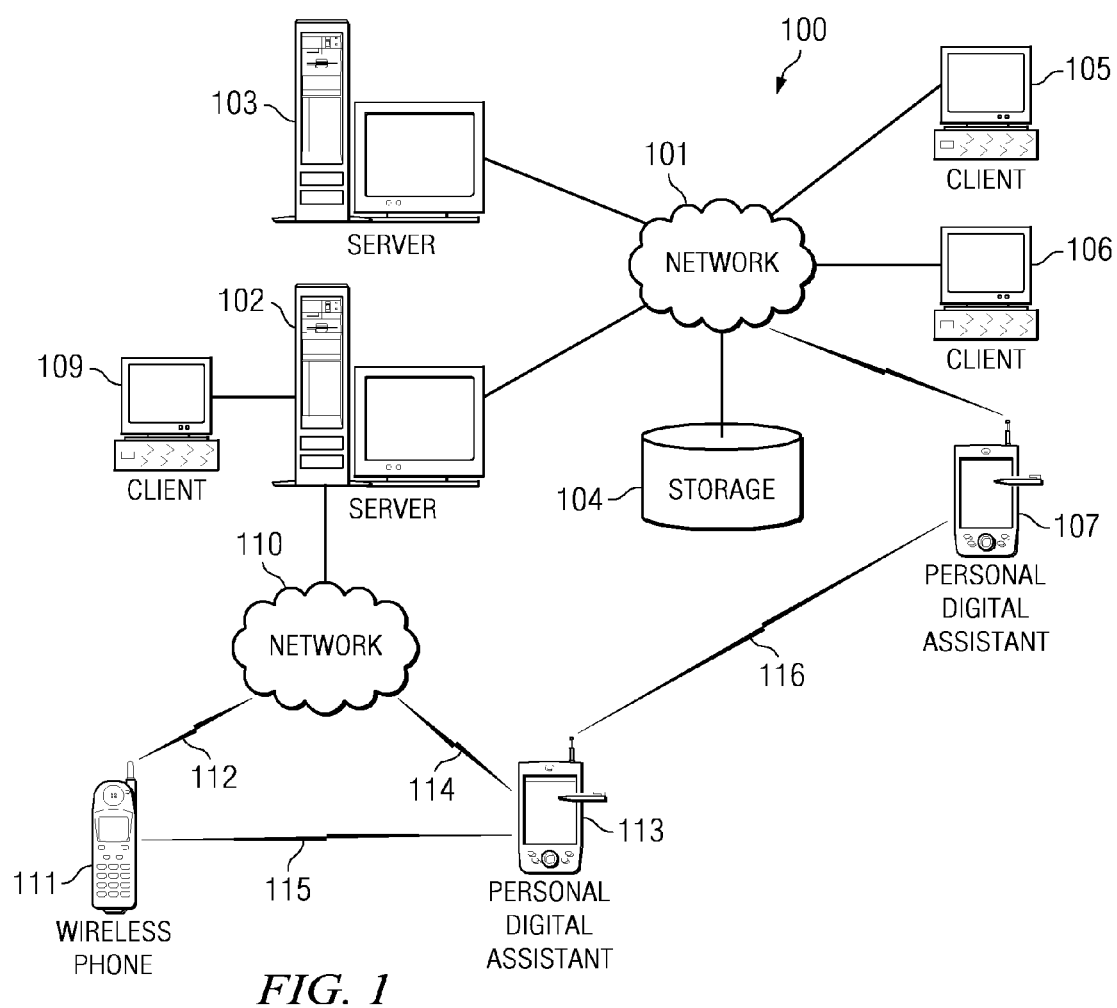
FIG. 1 depicts a pictorial representation of a distributed data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, FIG. 1 depicts a typical network of data processing systems, each of which may implement a portion of the illustrative embodiments. Data processing system 100 contains network 101, which is a medium that may be used to provide communications links between various devices and computers connected together within data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), and the like. Data processing system 100 may include additional servers, clients, routers, other devices, and peer-to-peer architectures that are not shown.

In the depicted example, data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), and so on. Of course, data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth wireless technology, to create so-called personal area networks (PAN) or personal ad-hoc networks. In a similar manner, PDA 113 can transfer data to PDA 107 via wireless communication link 116.

The illustrative embodiments may be implemented on a variety of hardware platforms; FIG. 1 is intended as an example of a heterogeneous computing environment and not as an architectural limitation for the illustrative embodiments.

Figure 2:
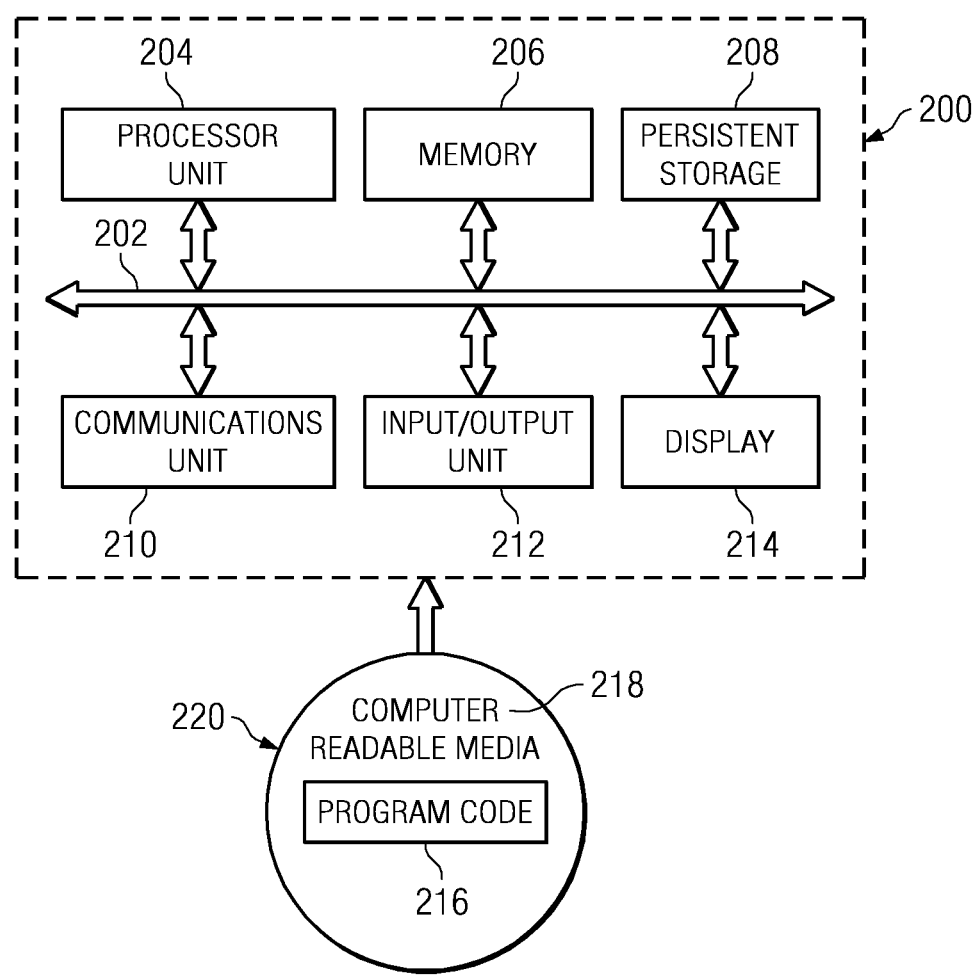
FIG. 2 is a block diagram of a typical computer architecture that may be used within a data processing system in which the illustrative embodiments may be implemented.

With reference now to FIG. 2, a block diagram of a data processing system is shown in which illustrative embodiments may be implemented. Data processing system 200 is an example of a computer, such as server 103 or client 105 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include inorganic components integrated with organic components and/or may be comprised entirely of organic components excluding a human being. For example, a storage device may be comprised of an organic semiconductor. As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Those of ordinary skill in the art will appreciate that the hardware in FIG. 2 may vary depending on the system implementation. For example, the system may have one or more processors, such as an Intel® Pentium® -based processor and a digital signal processor (DSP), and one or more types of volatile and non-volatile memory. Other peripheral devices may be used in addition to or in place of the hardware depicted in FIG. 2. The depicted examples are not meant to imply architectural limitations with respect to the illustrative embodiments.

In addition to being able to be implemented on a variety of hardware platforms, the illustrative embodiments may be implemented in a variety of software environments. A typical operating system may be used to control program execution within each data processing system. For example, one device may run a UNIX operating system, while another device contains a simple Java runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The illustrative embodiments may be implemented on a variety of hardware and software platforms, as described above with respect to FIG. 1 and FIG. 2. The descriptions of the figures herein may involve certain actions by either a client device or a user of the client device. One of ordinary skill in the art would understand that responses and/or requests to/from the client are sometimes initiated by a user and at other times are initiated automatically by a client, often on behalf of a user of the client. Thus, when a client or a user of a client is mentioned in the description of the figures, it should be understood that the terms "client" and "user" can be used interchangeably without significantly affecting the meaning of the described processes.

The descriptions of the figures herein may involve an exchange of information between various components, and the exchange of information may be described as being implemented via an exchange of messages, e.g., a request message followed by a response message. It should be noted that an exchange of information between computational components, which may include a synchronous or asynchronous request/response exchange, may be implemented equivalently via a variety of data exchange mechanisms, such as messages, method calls, remote procedure calls, event signaling, or other mechanism.

As previously mentioned, a paged search results function is often used in a communication protocol to control the rate at which search results are returned to the client from the directory server. In a paged search, a client request specifies the number of entries that should be returned at a time. While the paged search provides a basic method of limiting the dataset returned from the directory server to the requesting client application, the paged search does not provide enough flexibility in situations in which a client application needs to request different subsets of data from a directory server. For instance, the client application may need to request a subset of data from the directory server that falls within a certain range, and then subsequently request another subset of the data within another range using the same original search filter. In a particular example, the client application wants to obtain the names of persons in the directory who have the first name 'John'. Using representations within the LDAP communications protocol in this example, the search request may comprise a search request of all names within an organization that are sorted using a sort control by surname (SN) and a search filter by common name (CN), where CN=John. Within the first sorted search request, the client application wants to limit the data returned by sending a request for all matching entries (where CN=John) within a particular surname range (e.g., SN>=A and SN<=B) and sorted by SN. Within a subsequent sorted search request, the client application wants to request all matching entries (where CN=John) within another surname range (e.g., SN>=C and SN<=D) and sorted by SN. One existing approach to perform such sorted search requests is to enable the client application to concatenate the desired surname range onto the original search filter to form an extended search filter. In other words, the first filtered sorted search request would comprise the extended search filter CN=John && SN>=A && SN<=B, while the subsequent sorted search request would comprise the extended search filter CN=John && SN>=C && SN<=D. However, a drawback to this existing approach is that the concatenation functionality adds complexity to the client application, as well as additional filter resolution and sorting work on the side of the directory server that is evaluating the search request. The directory server is required to evaluate all of the data in the directory datastore every time a search request is received from the client application.

Another existing approach to perform such sorted search requests is to have the client application perform a sorted search with the search filter (e.g., CN=John) and request a specific page size (e.g., 15). The client application will filter through the matching results as they are returned from the directory server to identify the entries that match the surname filter SN>=A && SN<=B for the first request, and the surname filter SN>=C && SN<=D for the second request. This existing approach also contains drawbacks in that the burden is placed on the end application to perform at least a portion of the filtering process. There is also the possibility of the client application having to perform multiple search requests in order for the client application to obtain the desired range of data, as well as the possibility that more data may be returned by a search request than is actually needed by the client application.

The illustrative embodiments provide a solution to the problems above by providing a filter range based search control to request a range of data from a set of directory servers, wherein a set includes one or more servers. The filter range based search control may be used in a communication protocol (e.g., in a client application's search request and a directory server's search result response) to enable a client application to limit and control the search results that are returned to the requesting application. Rather than simply limiting the number of matching entries returned to the requesting client application as in existing paged search methods, the filter range based search control allows for limiting the search entries that a directory server returns to the client application by a specific filter range value.

The client application sends a request for data in a sorted format to a directory server. The request may contain a set of attributes and a search filter that defines the data desired by the client application. For example, the request may comprise a search filter control (f) for obtaining the names of all employees in a company who have the first name "John". The request also comprises a sort control (k) specifying how the client wants the returned data to be formatted, such as sorted in ascending or descending alphabetical or numerical order. The request further comprises a search range filter control (r) that is separate from the search filter (f) and that defines the range of sorted data desired by the client application. In order to use the range filter control in a search request, the sort control is also required to be included in the request. The attribute specified in the sort control is used to first determine the way the matching data entries should be sorted, and the range filter is then applied to the sorted entries to collect the desired data range. The range filter control uses the same attribute (e.g., SN) used in the sort control to filter the matching entries, but the range filter control specifies a value associated with the attribute (e.g., SN<=B). Thus, the client request comprises a search filter control, a sort key control, and a search range filter control which is provided to the directory server. In response to receiving the search request from the client application, the directory server returns the sorted entries matching the search filter that fall within the range of sorted data defined by search filter range control to the client application.

While the illustrative embodiments may be employed to obtain a range of data from a single directory server, the filter range based search control is also useful in situations where a client application is located in front of a plurality of directory servers that hold distributed data, and the directory servers need to return the requested data to the client application in a sorted fashion according to the sort key in the request. In a distributed directory environment, data is partitioned across multiple directory servers, also known as backend servers. Since each of the distributed directory servers can only perform a local sort of data, the client application is required to collect all of the matching entries from the distributed servers and perform a sort of the collected entries. The filter range based search control enables the client application to request ranges of data from the distributed directory servers, and thus allows the client application to more easily perform sorting of the data returned from each distributed server since only a particular set of data is returned from each server using the filter range based search control. If the client application sends multiple requests comprising different search filter ranges to the distributed servers, the client application may use sort key (k) to perform a sort of all of the search entries returned by distributed servers.

Figure 3:
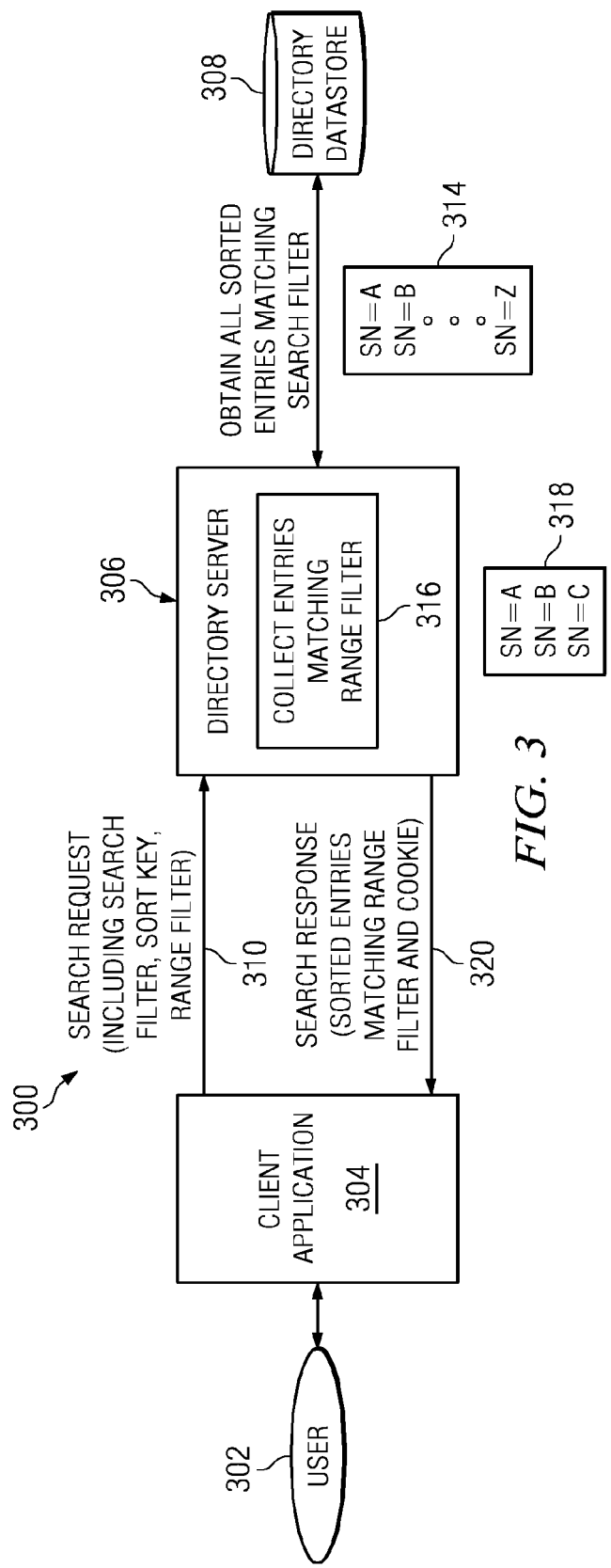
FIG. 3 depicts a block diagram that shows an exemplary directory environment for performing a filter range bound paged search in accordance with the illustrative embodiments.
Figure 4:
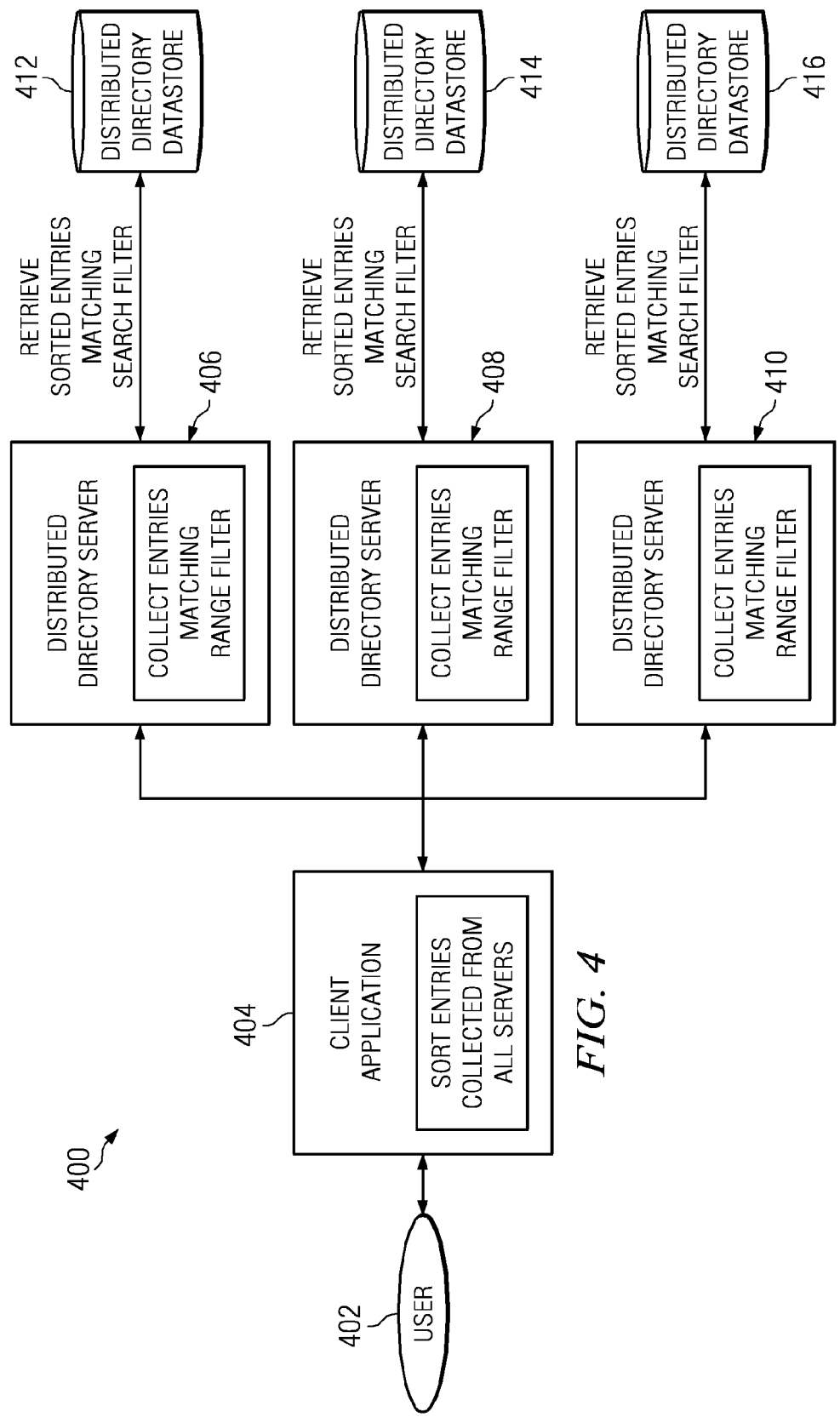
FIG. 4 depicts a block diagram that shows an exemplary distributed directory environment for performing a filter range bound paged search in accordance with the illustrative embodiments.

The illustrative embodiments may be implemented using a variety of directory implementation schemes and protocols, including, among others, X.500 directories and Lightweight Directory Access Protocol (LDAP) operations. FIGS. 3-4 illustrate example directory environments in which the illustrative embodiments may be implemented. In FIG. 3, a block diagram is depicted that shows an exemplary directory environment 300 for performing a filter range bound paged search in accordance with the illustrative embodiments. User 302 operates client application 304, which may execute on a client device such as client 105 shown in FIG. 1. Client application 304 interacts with directory server 306, such as server 103 shown in FIG. 1. Directory server 306 supports functionality for accessing a datastore that contains a directory, shown as directory datastore 308. A typical directory datastore is a relational database management (RDBM) server.

In this illustrative example, client application 304 sends a sorted search request 310 to backend directory server 306. Sorted search request 310 comprises a search filter and a particular sort key for the search. The sort key specifies a combination of sort attribute and sort order of the attribute (i.e., ascending or descending). If user 302 wants the names of all employees in alphabetical order, the search filter in such a request may be used to identify and return the names of all the employees in the company, and the sort attribute and preferred sort order of the returned data is specified as sorted by surname (SN) in alphabetical order. Directory server 306 obtains the requested data from directory datastore 308. Directory server 306 may retrieve the data from directory datastore 308 in a sorted order, thereby saving sorting efforts at the directory server application level. Alternatively, data entries matching the search filter obtained from directory datastore 308 may be sorted at directory server 306 based on the sort key from the client to form a complete sorted list of matching data entries.

Once directory server 306 obtains sorted data entries matching the search filter, directory server 306 then applies the range filter 316 specified in the search request to the complete sorted list of matching data entries. The range filter control in the search request comprises a range filter that specifies a same attribute (e.g., SN) that is used in the sort control to sort the entries matching the search filter. The range filter control also comprises a range filter value associated with the attribute that specifies the desired range of the attribute to filter the matching entries (e.g., SN<=B). Only those entries in the complete sorted list of matching data entries that match the specified requested range value will be returned in the response to client application 304. Thus, the range filter control in the search request may be used to limit the data returned to the client application by specifying a desired range of matching entries to be returned by the directory server in the search response, rather than by specifying the number of matching entries that should be returned by the server as performed in a page search request.

A cookie may be passed between client application 304 and directory server 306 to track the current connection of the client application and the directory server and inform the directory server that a search request is a continuation of the previous request. A search request is a continuation of a previous search request if the search request comprises the same search filter value and the same sort key as the previous search request, but a different range filter value. The cookie associates the current search with a previous search. The presence of the cookie in the search request informs the directory server that the current request is a continuation of the previous search request. The directory server may also perform a sanity check on the associated cookie. The sanity check validates that the current request is a continuation of the previous search request by determining that parameters contained in the cookie match the other parameters of the previous search. Directory server 306 includes the cookie when providing search results response 320 to client application 304. Client application 304 may include the cookie in a subsequent search request to directory server 306 to inform directory server 306 that the current request is a continuation of the previous request.

When directory server 306 detects the cookie in the current request, directory server 306 uses the complete sorted list of matching data entries obtained when processing the previous request to process the current request. Directory server 306 may use the complete sorted list of all matching entries collected from the previous request since the search filter and sort key in the current request are the same as the search filter and sort key in the previous request. Consequently, directory server 306 does not need to re-search the directory datastore for entries matching the search filter. Directory server 306 applies the new range filter specified in the current request to the complete sorted list to collect the entries in the sorted list that match the new range filter value, but which also are located in the sorted list after the entries specified in the previous range filter value. The entries specified in the previous range filter value have already been returned to client application 304, so these entries are omitted from the current result set. In this manner, directory server 306 may reduce processing time by reusing the complete sorted list of matching entries obtained when processing the previous request and collecting the entries in the sorted list that match the new range filter, while excluding the entries returned in the previous search results. Directory server 306 then provides the sorted search results response comprising the new desired range of entries to client application 304.

A specific application of the filter range bound paged search may be described using the previously mentioned example in which a user wants to obtain the names of employees in a company who have the first name "John" (e.g., CN=John). In this example, the user also wants to limit the amount of data returned by the search, and uses the range filter control in the sorted search request to request only those matching entries where the last name falls within a particular range, such as SN>=A through SN<=C. Upon receiving the request, directory server 306 obtains all sorted entries in directory datastore 308 that match the search filter CN=John to form a complete sorted list of all of the matching entries. The sorted matching data entries are represented for purposes of illustration in FIG. 3 as result list 314 (SN=A to SN=Z in this example). Directory server 306 then applies the range filter specified in the request to the sorted list of matching entries to collect only those entries that match the values specified in the range filter. For example, if the range filter value specified is a surname filter SN>=A through SN<=C, directory server 306 will collect only the matching entries that have a surname that begins with A, B, or C and will provide a response comprising these entries and a cookie to client application 304. The filtered range of sorted matching data entries are represented for purposes of illustration as filtered result list 318 which shows an example of entries matching the range filter value of SN>=A through SN<=C.

In a subsequent search request, the user wants to request matching entries where the last name falls within a different range. Client application 304 sends a search request comprising the cookie and a new range filter, e.g., SN<=E, to directory server 306. Since all the entries in the complete sorted list of matching entries where SN<=C were already returned in the previous response to client application 304, directory server 306 only needs to collect the entries in the complete sorted list of matching entries that match the current range filter value, while excluding the entries matching the last range filter value. Thus, in this example, directory server 306 will provide a response comprising the sorted entries having a surname that begins with D and E (and an associated cookie) to client application 304.

FIG. 4 depicts a block diagram that shows an exemplary distributed directory environment for performing a filter range bound paged search in accordance with the illustrative embodiments. Distributed directory environment 400 may include multiple directory servers that interoperate within a same distributed data processing environment as client application 404, e.g., in a manner similar to the distributed data processing environment shown in FIG. 1.

In distributed directory environment 400, user 402 operates client application 404, which may execute on a client device such as client 105 shown in FIG. 1. Distributed directory servers 406-410 support functionality for accessing datastores that contain portions of a distributed directory, i.e. portions of a directory information tree, shown as distributed directory datastores 412-416. Data entries that are of interest to a particular directory operation may reside in different portions of a distributed directory that are supported on different systems.

Like directory environment 300 in FIG. 3, client application 404 in distributed directory environment 400 sends a sorted search request comprising a search filter control, a sort control, and a range filter control. However, as a distributed directory is a directory environment in which data is partitioned across multiple directory servers, client application 404 in distributed directory environment 400 sends the search request to each of distributed directory servers 406-410. Each of distributed directory servers 406-410 obtains the data entries matching the search filter in the request in a sorted order according to the sort key value in the request from its respective datastore 412-416, and then applies the range filter specified in the request to its sorted list of data entries matching the search filter. Each of distributed directory servers 406-410 then provides the data entries matching the range filter value to client application 404. Since each of distributed directory servers 406-410 may only perform a local sort of data, client application 404 performs a sort of all of the data entries matching the range filter value received from distributed directory servers 406-410 to generate a sorted list of all matching data entries in distributed directory environment 400 that fall within the specific range filter specified in the search request.

In an alternative embodiment, the distributed directory environment may include a proxy server that acts as an intermediate agent between client application 404 and distributed directory servers 406-410. Client application 404 may bind to the proxy server instead of directly binding to the backend servers. Client application 404 may send a search request comprising a search filter control, a sort control, and a search filter range control to the proxy server. The proxy server sends the request to the distributed directory servers 406-410, which return search entries matching the attributes in the search request. If client application 404 sends multiple requests comprising different search filter ranges to the proxy server, the proxy server may use sort key to perform the sorting of all of the range filtered data returned from distributed directory servers 406-410. The proxy then forwards the sorted range filtered data to client application 404.

Figure 5:
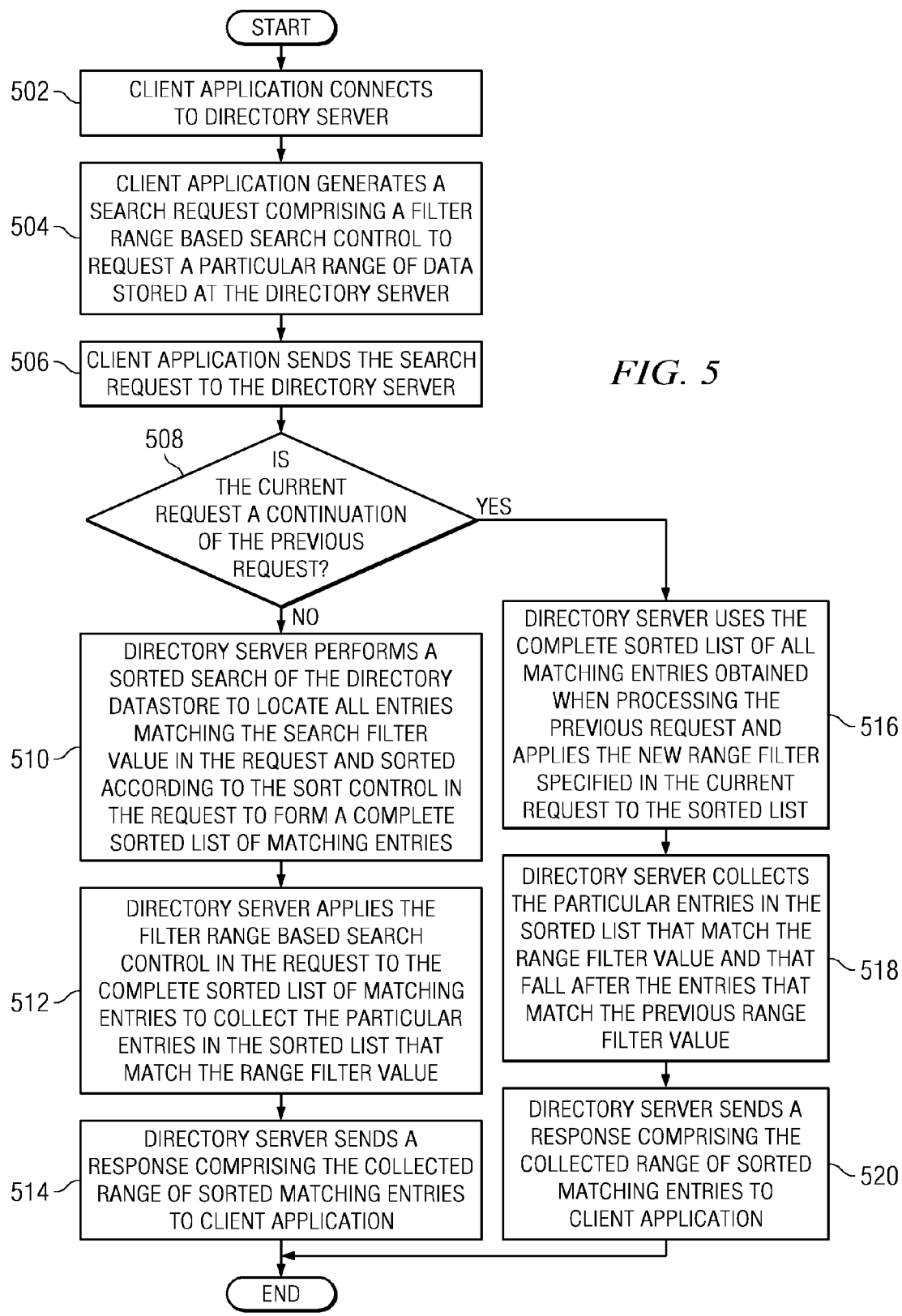
FIG. 5 illustrates a flowchart of a process for using a filter range based search control in a communication protocol to perform a paged search of a directory in accordance with the illustrative embodiments.

FIG. 5 illustrates a flowchart of a process for using a filter range based search control in a communication protocol to perform a paged search of a directory in accordance with the illustrative embodiments. The process described in FIG. 5 may be implemented in a data processing environment such as depicted in FIG. 3.

The process begins with a client application in the data processing environment connecting to a directory server (step 502). The client application then generates a search request for a range of data stored at the directory server (step 504). The client request may comprise a search filter control for defining the desired data, a sort control for defining the desired sort order of the returned data, a range filter control for defining the desired range of entries in all of the data that matched the search filter. The client application then sends the search request comprising the range filter control to the directory server(s) that contains the requested data (step 506).

When a directory server receives the search request, the directory server determines if the current search request is a continuation of the previous request (step 508). The directory server may determine that the current search request is a continuation of the previous request if the directory server locates a cookie in the request. The presence of the cookie indicates to the directory server that the current search request is a continuation of the previous request.

If the current search request is not a continuation of the previous request ("no" output of step 508), the directory server handles the request as an initial search request. The directory server performs a sorted search of the directory to locate all entries matching the search filter specified in the request and sorted according to the sort control specified in the request (step 510). At this point, the directory server has a complete sorted list of all entries matching the search filter criteria. The directory server then applies the filter range based search control specified in the request to the sorted list of matching entries to collect the particular entries in the sorted list that match the range filter value specified in the request (step 512). The directory server then sends a search results response comprising the collected range of sorted matching entries to the client application (step 514). The search results message also includes an associated cookie.

Turning back to step 508, if the current search request is a continuation of the previous request ("yes" output of step 508), the directory server handles the current request as a subsequent search request from the client application. Since the search filter and sort key in the current request are the same as the search filter and sort key in the previous request, the directory server uses the complete sorted list of all entries matching the search filter criteria as collected in processing the previous request to process the current search request, and applies the new range filter specified in the current request to the sorted list (step 516). The directory server then collects the entries in the sorted list that match the range filter value in the current request and that are located in the sorted list after the entries that match the range filter value in the previous request (step 518). Thus, the directory server collects the entries in the sorted list that match the new range filter, while excluding the entries that were returned in the previous search results. The directory server then sends a search results response comprising the collected range of sorted matching entries to the client application (step 520).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The invention can also take the form of a computer program product which has been downloaded over a network from one device to another for use in the other device. For instance, the program code stored in a computer readable storage medium in a server data processing system may be downloaded over a network from the server to a remote data processing system, such as a client or another server. Likewise, the program code stored in a computer readable storage medium in a client data processing system may be downloaded over a network from the client to a remote data processing system, such as a server or another client.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for performing a filtered search in a directory environment, the computer implemented method comprising:
   receiving, at a directory server, a search request from a client application comprising a search filter control, a sort control and a range filter control, wherein the search filter control defines a set of requested data, wherein the sort control defines a sorting order of the set of requested data, and wherein the range filter control defines a range of entries in the set of requested data;
   obtaining data entries from a set of directories associated with the directory server, wherein the data entries match a search value defined in the search filter control, and wherein the matching data entries are sorted according to sort attributes defined in the sort control to form a sorted list of matching entries;
   collecting a subset of data entries in the sorted list of matching entries, wherein the subset of data entries match a range value defined in the range filter control;
   sending a response comprising the collected subset of data entries to the client application;
   receiving, at the directory server, a subsequent search request from the client application, wherein the subsequent search request comprises a same search filter control and a same sort control as the search request, and wherein the subsequent search request comprises a new range filter control;

determining that the subsequent search request is a continuation of the search request from the client application;

collecting a second subset of data entries in the sorted list of matching entries, wherein the second subset of data entries match a new range value defined in the new range filter control; and sending a second response comprising the collected second subset of data entries to the client application;

wherein the set of directories associated with the directory server each contain portions of a distributed directory that is organized within a hierarchical namespace.

2. The computer implemented method of claim 1, wherein collecting a second subset of data entries in the sorted list of matching entries further comprises collecting only entries in the sorted list that match the new range value defined in the new range filter control and are located in the sorted list after the range value defined in the range filter control.

3. The computer implemented method of claim 1, further comprising:

responsive to receiving, at the client application, responses comprising collected subsets of data entries from a plurality of directory servers, sorting the collected subsets of data entries at the client application according to the sort key defined in the sort control.

4. The computer implemented method of claim 1, wherein the range filter control defines a same attribute as the sort attribute defined in the sort control, and wherein the range filter control specifies a value for the attribute.

5. A computer implemented method for performing a filtered search in a directory environment, the computer implemented method comprising:

receiving, at a directory server, a search request from a client application comprising a search filter control, a sort control and a range filter control, wherein the search filter control defines a set of requested data, wherein the sort control defines a sorting order of the set of requested data, and wherein the range filter control defines a range of entries in the set of requested data;

obtaining data entries from a set of directories associated with the directory server, wherein the data entries match a search value defined in the search filter control, and wherein the matching data entries are sorted according to sort attributes defined in the sort control to form a sorted list of matching entries;

collecting a subset of data entries in the sorted list of matching entries, wherein the subset of data entries match a range value defined in the range filter control; and sending a response comprising the collected subset of data entries to the client application, wherein sending a response comprising the collected subset of data entries to the client application further comprises including a cookie in the response to the client application, and wherein the client application includes the cookie in the subsequent search request to indicate to the directory server that the subsequent search request is a continuation of the search request.

6. A data processing system for performing a filtered search in a directory environment, the data processing system for comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to receive, at a directory server, a search request from a client application comprising a search filter control, a sort control and a range filter control, wherein the search filter control defines a set of requested data, wherein the sort control defines a sorting order of the set of requested data, and wherein the range filter control defines a range of entries in the set of requested data; obtain data entries from a set of directories associated with the directory server, wherein the data entries match a search value defined in the search filter control, and wherein the matching data entries are sorted according to sort attributes defined in the sort control to form a sorted list of matching entries; collect a subset of data entries in the sorted list of matching entries, wherein the subset of data entries match a range value defined in the range filter control; send a response comprising the collected subset of data entries to the client application; receive, at the directory server, a subsequent search request from the client application, wherein the subsequent search request comprises a same search filter control and a same sort control as the search request, and wherein the subsequent search request comprises a new range filter control; determine that the subsequent search request is a continuation of the search request from the client application; collect a second subset of data entries in the sorted list of matching entries, wherein the second subset of data entries match a new range value defined in the new range filter control; and send a second response comprising the collected second subset of data entries to the client application, wherein the set of directories associated with the directory server each contain portions of a distributed directory that is organized within a hierarchical namespace.

7. The data processing system of claim 6, wherein the computer usable code to collect a second subset of data entries in the sorted list of matching entries further comprises computer usable code to collect only entries in the sorted list that match the new range value defined in the new range filter control and are located in the sorted list after the range value defined in the range filter control.

8. The data processing system of claim 6, wherein the computer usable code to send a response comprising the collected subset of data entries to the client application further comprises including a cookie in the response to the client application, and wherein the client application includes the cookie in the subsequent search request to indicate to the directory server that the subsequent search request is a continuation of the search request.

9. A computer program product for performing a filtered search in a directory environment, the computer program product comprising:

a tangible computer usable storage medium having computer usable program code tangibly stored thereon, the computer usable program code comprising:

computer usable program code for receiving, at a directory server, a search request from a client application comprising a search filter control, a sort control and a range filter control, wherein the search filter control defines a set of requested data, wherein the sort control defines a sorting order of the set of requested data, and wherein the range filter control defines a range of entries in the set of requested data;

computer usable program code for obtaining data entries from a set of directories associated with the directory server, wherein the data entries match a search value defined in the search filter control, and wherein the matching data entries are sorted according to sort attributes defined in the sort control to form a sorted list of matching entries;

computer usable program code for collecting a subset of data entries in the sorted list of matching entries, wherein the subset of data entries match a range value defined in the range filter control;

computer usable program code for sending a response comprising the collected subset of data entries to the client application;

computer usable program code for receiving, at the directory server, a subsequent search request from the client application, wherein the subsequent search request comprises a same search filter control and a same sort control as the search request, and wherein the subsequent search request comprises a new range filter control;

computer usable program code for determining that the subsequent search request is a continuation of the search request from the client application;

computer usable program code for collecting a second subset of data entries in the sorted list of matching entries, wherein the second subset of data entries match a new range value defined in the new range filter control; and computer usable program code for sending a second response comprising the collected second subset of data entries to the client application;

wherein the set of directories associated with the directory server each contain portions of a distributed directory that is organized within a hierarchical namespace.

10. The computer program product of claim 9, wherein the computer usable program code for collecting a second subset of data entries in the sorted list of matching entries further comprises computer usable program code for collecting only entries in the sorted list that match the new range value defined in the new range filter control and are located in the sorted list after the range value defined in the range filter control.

11. The computer program product of claim 9, further comprising:

computer usable program code for sorting the collected subsets of data entries at the client application according to the sort key defined in the sort control in response to receiving, at the client application, responses comprising collected subset of data entries from a plurality of directory servers.

12. The computer program product of claim 9, wherein the range filter control defines a same attribute as the sort attribute defined in the sort control, and wherein the range filter control specifies a value for the attribute.

13. The computer program product of claim 9, wherein the computer usable program code is stored in a computer readable storage medium in a data processing system, and wherein the computer usable program code is downloaded over a network from a remote data processing system.

14. The computer program product of claim 9, wherein the computer usable program code is stored in a computer readable storage medium in a server data processing system, and wherein the computer usable program code is downloaded over a network from a remote data processing system for use in a computer readable storage medium with the remote system.

15. A computer program product for performing a filtered search in a directory environment, the computer program product comprising:

a tangible computer usable storage medium having computer usable program code tangibly stored thereon, the computer usable program code comprising:

computer usable program code for receiving, at a directory server, a search request from a client application comprising a search filter control, a sort control and a range filter control, wherein the search filter control defines a set of requested data, wherein the sort control defines a sorting order of the set of requested data, and wherein the range filter control defines a range of entries in the set of requested data;

computer usable program code for obtaining data entries from a set of directories associated with the directory server, wherein the data entries match a search value defined in the search filter control, and wherein the matching data entries are sorted according to sort attributes defined in the sort control to form a sorted list of matching entries;

computer usable program code for collecting a subset of data entries in the sorted list of matching entries, wherein the subset of data entries match a range value defined in the range filter control; and computer usable program code for sending a response comprising the collected subset of data entries to the client application, wherein the computer usable program code for sending a response comprising the collected subset of data entries to the client application further comprises including a cookie in the response to the client application, and wherein the client application includes the cookie in the subsequent search request to indicate to the directory server that the subsequent search request is a continuation of the search request.

* * * * *